May 9, 1967 J. J. MATWIJCOW 3,317,998
INTERLOCKED BLADE AND HOLDER HAVING RESILIENT LATCHING MEANS
Filed Sept. 20, 1965
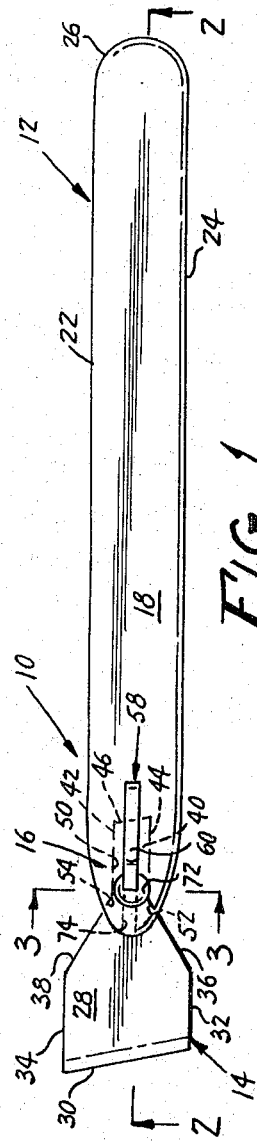
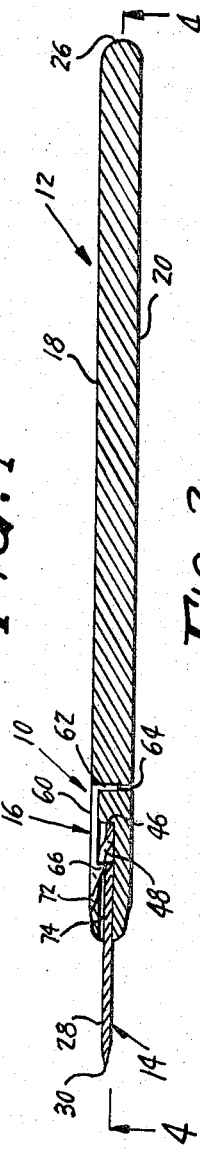
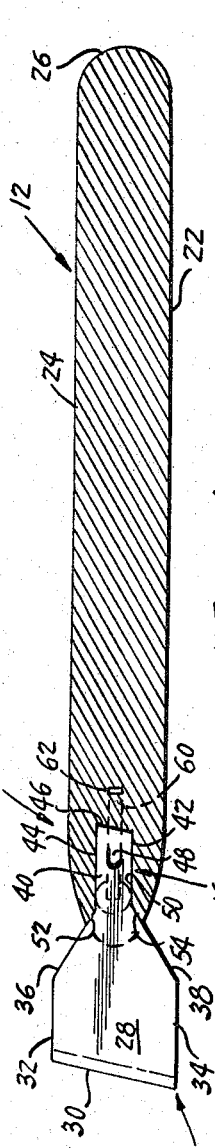
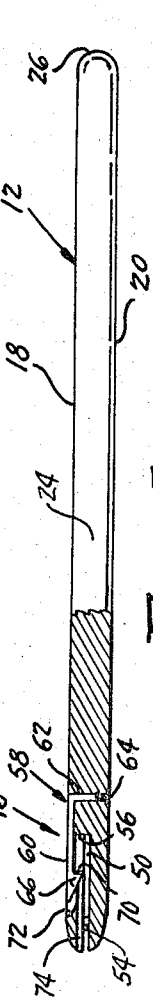
INVENTOR.
JOHN J. MATWIJCOW
BY *Kimmel, Crowell & Weaver*
ATTORNEYS.

United States Patent Office 3,317,998
Patented May 9, 1967

---

3,317,998
INTERLOCKED BLADE AND HOLDER HAVING RESILIENT LATCHING MEANS
John J. Matwijcow, 31 Charles Terrace, New Market, N.J.
Filed Sept. 20, 1965, Ser. No. 488,429
4 Claims. (Cl. 30—338)

This invention relates to a device for selectively receiving and holding a working tool, and more particularly to a holder for cutting blades, such as scalpels, woodworking knives, leather working knives, and the like.

It is an object of the instant invention to provide a handle of the character described which may readily receive and rigidly hold a cutting blade.

Another object of the instant invention is to provide a handle which may be readily operated by an individual to release a working implement or blade secured therein.

Still another object of the instant invention is to provide a handle of the character described which may be economically manufactured, which is long-lasting and which requires little or no maintenance.

A more specific object of the instant invention is to provide a latching means for securing a handle to a blade incorporating a spring biased detent on the handle engageable with a suitable abutment on the working tool.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a top plan view of the holder and blade of the instant invention;

FIGURE 2 is a longitudinal vertical cross-sectional view taken substantially along line 2—2 of FIGURE 1 viewing in the direction of the arrows;

FIGURE 3 is a transverse vertical cross-sectional view of the holder and connection of FIGURES 1 and 2, inclusive, taken substantially along line 3—3 of FIGURE 1 viewing in the direction of the arrows;

FIGURE 4 is a longitudinal horizontal cross-sectional view of the device of FIGURES 1 to 2, inclusive, taken substantially along line 4—4 of FIGURE 2 viewing in the direction of the arrows; and FIGURE 5 is a side elevational view of the handle of FIGURES 1, 2 and 4, certain parts being broken away for clarity of illustrations.

Referring now to the drawing in detail, wherein like reference characters designate like elements throughout the several views thereof, there is indicated generally at 10 a cutting tool having as its major components a handle designated generally at 12, a cutting implement or blade indicated generally at 14 and a latch means indicated generally at 16 for securing together handle 12 and cutting implement 14. Handle 12 includes a body which is preferably of metal, but which may be of any other suitable substance, such as hard plastic, having an upper planar surface 18 and a lower parallel surface 20, which my be either shiny or of a rougher finish. Upper and lower surfaces 18, 20 are joined by arcuate side walls 22, 24 and an arcuate real end wall 26.

Blade 14 includes an enlarged body 28 forming a cutting edge 30 having side edges 32, 34 substantially parallel to the longitudinal axis of handle 12. A pair of rear edges 36, 38 diverge toward cutting edge 30 and connect body 28 to a shank 40 of lesser width than body 28. Shank 40 includes a pair of parallel side edges 42, 44 and a rear edge 46 inclined at an acute angle with respect to the transverse axis of cutting tool 10. Cutting edge 30 extends substantially parallel to the inclined rear edge 46.

As may be seen in FIGURE 3, blade 14 is of substantially equal thickness throughout body 28 and shank 40 with shank 40 providing an abutment 48 extending beyond the nominal thickness of shank 40 and constituting a resilient bar. It will be apparent that abutment 48 may be made by stamping a small section from shank 40 in a known manner.

Latch means 16 includes a slot 50 closely receiving shank 40 and having outwardly diverging shoulders 52, 54 against which complementary rear edges of shoulders 36, 38 of blade 14 abut. The rear end of slot 50 perpendicularly communicates with a channel 56 formed in handle 12 receiving an L-shaped detent means designated generally at 58. Detent means 58 is an L-shaped structure having a long leg 60 normally seating in channel 56 and a short leg 62 secured in a vertical aperture 64 formed in handle 12 rearwardly of slot 50.

The forward terminal end of long leg 60 of detent means 58 carries a lug 66 having an upwardly inclined forwad face 68 and a vertically disposed rear edge 70 with lug 66 extending at least through channel 56 to the upper edge of slot 50. Latch means 16 includes an indentation or concavity 72 formed in handle 12 adjacent the forward end of lug 66 such that an individual may use a fingernail to engage forward face 68 and outwardly pivot long leg 60 away from channel 56. A guide groove 74 is formed in handle 12 aligned and communicating with slot 50 for guiding and receiving abutment 48 during assembly and disassembly of cutting tool 10.

In the assembly of cutting implement 14 to handle 12, shank 40 is inserted into slot 50 with groove 74 receiving abutment 48. When the shank 40 is fully inserted into slot 50, abutment 48 seats in channel 56 in a position to engage vertical edge 70 of lug 66. It should be understood that detent means 58 is resiliently biased toward handle 12 to lie in substantially flush position as shown in FIGURE 5. As abutment 48 moves through guide groove 70, it contacts inclined forward face 68 of lug 66 to cam long leg 60 outwardly, thus raising lug 66 and allowing abutment 48 to pass therebeneath.

When it is desired to remove cutting implement 14 from handle 12, an individual may place a fingernail within indentation 72, to engage forward face 68 of lug 66. An outward pull releases vertical face 70 of lug 66 from engagement with abutment 48, and blade 14 may then be slid outwardly by grasping the forward end thereof, the other hand with abutment 48 sliding through guide groove 74.

When cutting tool 10 is assembled, and blade 30 is being utilized to perform a cutting operation, shoulders or rear edges 36, 38 of blade 14 are engaged by forwardly diverging shoulders 52, 54 of slot 50. Inclined rear edge 46 of shank 40 seats against the complementary inclined rear edge of slot 50 for added support. It will be apparent that engagement of vertical face 68 of lug 66 with abutment 48 of shank 40 releasably to retain handle 12 and blade 14 in assembled relation. It is also pointed out that slot 50 is considerably wider than either channel 56 or guide groove 74, so that shank 40 is reinforced on its opposite flat sides by handle 12.

It will now seem that there is herein provided an improved cutting tool which accomplishes all of the objects of this invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:
1. A cutting tool comprising an elongated handle and a blade, said blade including a flat body portion having a planar shank extending from one side thereof and a cutting edge on another side, said shank having a pair of substantially parallel sides and a detent projecting from one flat side of said shank adjacent the end thereof remote from said body portion, said handle including a pair of opposed substantially flat surfaces and at least one tapered end, said tapered end having a flat slot therein lying in a plane substantially intermediate said flat surfaces of said handle and in a plane parallel to said flat surfaces, at least portions of the edges of said slot being parallel and dimensioned to receive said shank, said handle having an internal groove aligned and communicating with said slot for the slidable reception of said detent, said handle having a channel formed in one flat face thereof aligned with said groove and extending therethrough into communication with said flat slot, an L-shaped detent means formed of resilient material including a long leg seating in said channel and a perpendicular short leg, said handle having an aperture therein receiving said short leg for retention of said detent means, and a lug on the end of said long leg remote from said short leg extending through said channel and slot, said lug having a flat surface normally perpendicular to said long leg engageable with said detent and an opposite inclined camming surface permitting insertion of said detent into said groove behind said flat surface.

2. The structure of claim 1 including a concavity formed in said handle adjacent the end of said channel facilitating the insertion of a fingernail to lift said long leg and release said lug from said detent permitting removal of said blade.

3. The structure of claim 1 wherein said body of said blade is formed with diverging flat shoulders on opposite sides of said shank, and said slot is formed with complementary shoulders adjacent its open end against which said first mentioned shoulders seat.

4. The structure of claim 1 wherein said shank is formed with an end portion inclined at an angle to the parallel sides thereof and the closed end of said slot is correspondingly inclined to receive said end portion in abutting relation, said cutting edge extending in substantial parallelism to said inclined end portion.

References Cited by the Examiner

UNITED STATES PATENTS

| 1,940,855 | 12/1933 | Friedman | 30—337 X |
| 2,316,985 | 4/1943 | Niedermayer | 30—339 X |
| 2,895,217 | 7/1959 | Fisher | 30—169 |

FOREIGN PATENTS 846,877   8/1960   Great Britain.

WILLIAM FELDMAN, *Primary Examiner.*

G. WEIDENFELD, *Assistant Examiner.*